2,750,531

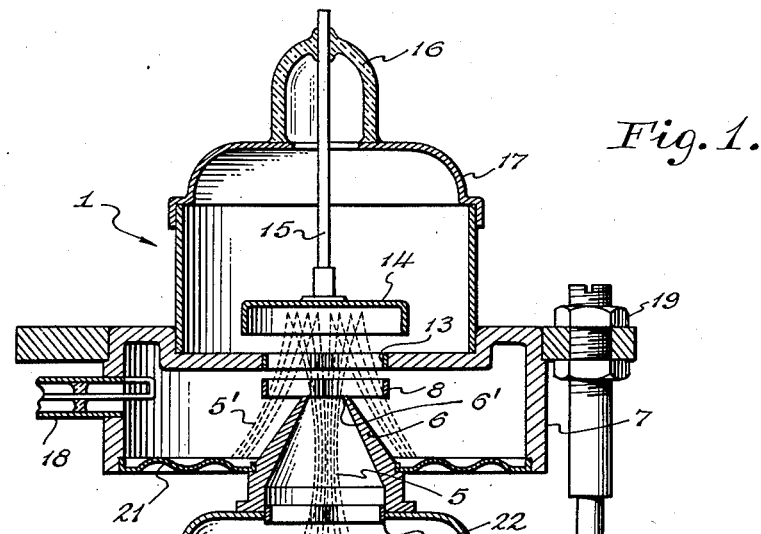
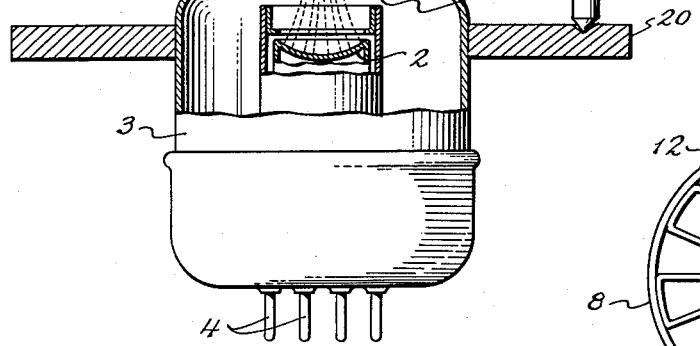
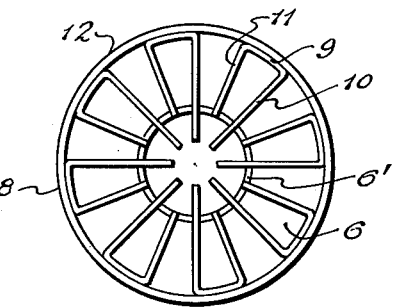
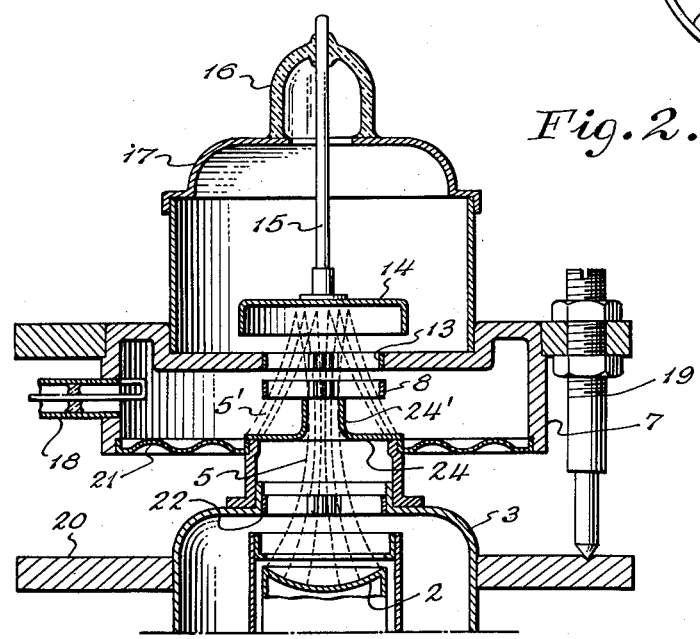
INVENTOR
ROBERT W. STERLING
BY
Paul B. Hunter
ATTORNEY June 12, 1956
R. W. STERLING
2,750,531
HIGH FREQUENCY TUBE STRUCTURE
Filed Feb. 28, 1951
2 Sheets-Sheet 2
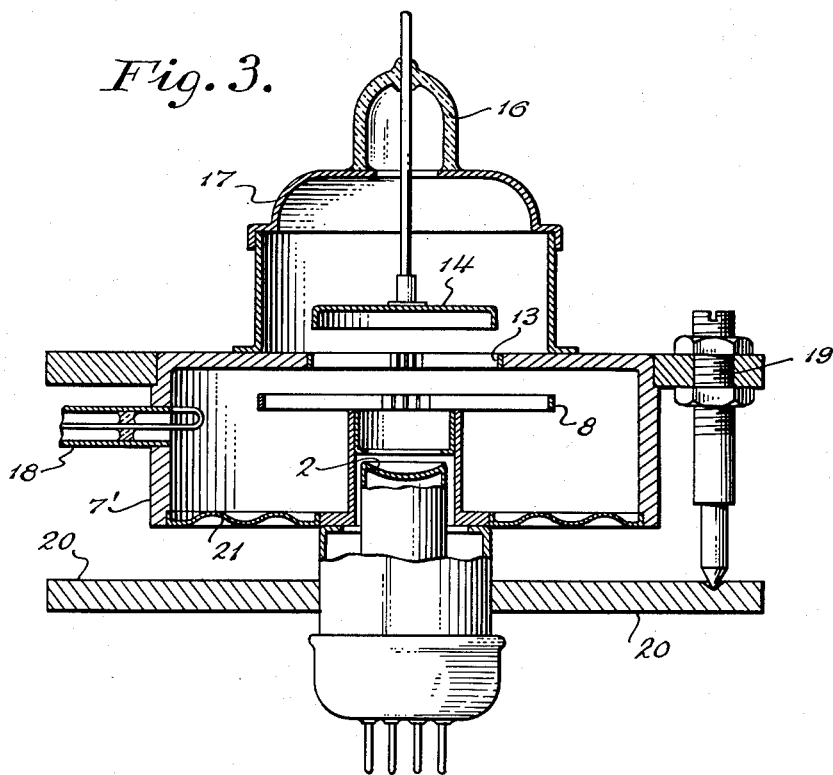
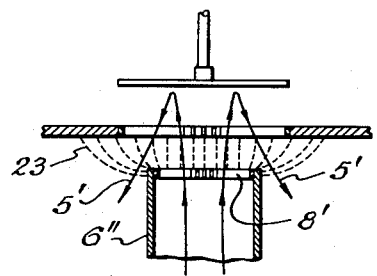
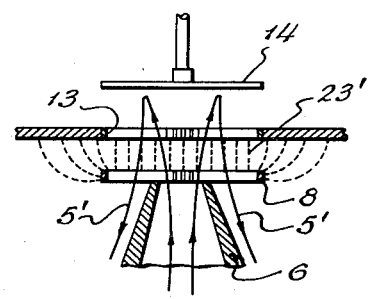
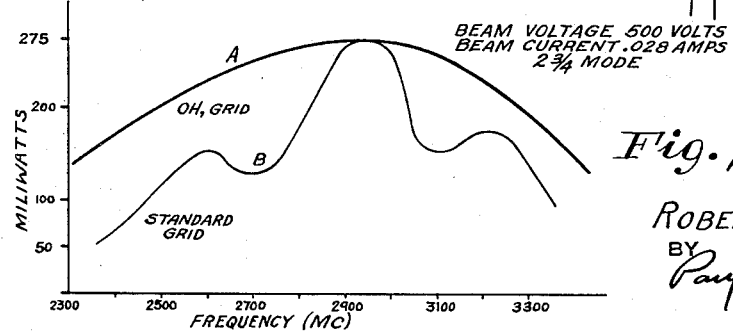
INVENTOR
ROBERT W. STERLING
BY
*Paul B. Hunter*
ATTORNEY

United States Patent Office 2,750,531
Patented June 12, 1956

HIGH FREQUENCY TUBE STRUCTURE

Robert W. Sterling, Huntington, N. Y., assignor to Sperry Rand Corporation, a corporation of Delaware Application February 28, 1951, Serial No. 213,274

6 Claims. (Cl. 315—5)

This invention relates generally, to high frequency tube structures and the invention has reference, more particularly, to a novel high frequency tube structure of the reflex klystron type wherein hysteresis is substantially eliminated.

Heretofore reflex klystrons, as generally constructed, have been subject to considerable hysteresis loss due to the passage of returning electrons back into the cathode region. These returning electrons passing through the gap region of the resonator into the region of the cathode are out of phase with the primary electrons leaving the cathode and, therefore, detract or lessen the bunching effect of the primary electrons produced by the initial passage of these electrons through the resonator. This lessening of the bunching effect of the primary electrons greatly reduces the output power and efficiency of the tube.

The principal object of the present invention is to provide a novel high frequency tube structure of the reflex klystron type, so constructed that the first transit electrons are maintained separate from the electrons passing back into the resonator after being reflected, the said tube structure utilizing a novel overhanging grid through which the returning electrons pass and are thereafter collected upon the inner walls of the resonator.

Another object of the present invention is to provide a high frequency tube structure employing a novel overhanging grid, which acts to reduce fringing or distortion of the electric field at the resonator gap, so that returning electrons move substantially parallel to the electric alternating field component in passing through the resonator gap, thereby greatly increasing the output power of the tube, especially at the upper and lower ends of the tuning range.

Another object of the present invention is to provide a high frequency tube structure employing a high angle convergent beam designed so that during its initial passage into the tube resonator, its minimum diameter coincides with the opening in the resonator grid, the said beam, due to its own space charge being split so it forms a tubular return beam after reflection from the tube reflecting electrode, said tubular return beam passing through the novel overhanging grid and falling harmlessly upon the inner walls of the resonator.

Still another object of the present invention is to provide a novel high frequency tube structure of the capacity loaded type, wherein tubes of differing frequencies can be built by varying the diameter of the overhanging grid and without the necessity of changing the resonator external dimensions.

Still another object of the present invention is to provide a novel high frequency tube structure, wherein the overhanging grid used enables a reduction in the grid density, while, at the same time, reducing microphonics during tube operation.

Other objects and advantages will become apparent from the specification, taken in connection with the accompanying drawings wherein the invention is embodied in concrete form.

In the drawings,

Fig. 1 is a sectional view of the novel tube structure of the present invention;

Fig. 2 is a view similar to Figure 1 of a slightly modified construction;

Fig. 3 is a sectional view showing a tube with increased capacity loading;

Fig. 4 is an enlarged sectional view of the overhanging grid structure and supporting reentrant tube therefor illustrating the paths of the primary and secondary transit electons;

Figs. 5 and 6 are fragmentary views comparing the action of a non-overhanging grid structure with that of the overhanging grid structure; and Fig. 7 is a graph showing the elimination of hysteresis by the use of the grid structure of this invention.

Referring now to Figure 1 of the drawings, the reference numeral 1 designates a velocity modulation tube of the reflex klystron type. This tube comprises a cathode 2 of the wide angle focusing type, contained within a base 3 having terminals 4. The cathode 2 produces an electron beam 5, which converges and passes through a tubular shielding means comprising the hollow reentrant portion 6 of an electromagnetic cavity resonator 7. The reentrant portion 6 is shown as of substantially frusto-conical shape, with its inner reduced end apertured for passing the beam 5 therethrough and into the resonator 7. The reentrant portion or header 6 is shown provided, at its inner end, with the novel overhanging grid 8 of this invention. The electron beam 5 from cathode 2 passes through an electron permeable inner portion of grid 8.

This grid 8, as shown in enlarged plan view in Fig. 4, has mutually spaced U-shaped tines 9, said tines having long blades 10 and shorter blades 11, which blades are directed radially inwardly from the periphery of the grid. The shorter legs 11 are shown as terminating upon and secured to the reduced inner open end portion 6' of the header 6, and similarly, the long legs 10 are secured intermediate their lengths to the end portion 6' of this header, and also project radially inwardly of this header for cooperating with the electron beam during its initial transit through the resonator. Actually, the legs 10 and 11 are made extremely thin so as to intercept a minimum of electrons of the beam. The individual tines 9 are shown secured to and carrying a peripheral ring 12.

The grid 8 is somewhat spaced from and cooperates with a second and similar grid 13 mounted in an aperture in the wall of resonator 7 opposite the wall carrying the header 6. A reflector electrode 14 is shown positioned beyond the resonator 7 and is maintained at such potential as to reflect the electron beam 5 back into the resonator 7 through the grid 13. The reflector 14 is shown carried by a conducting rod 15, which passes through and is sealed in a vitreous sealing dome 16 that is carried by a housing 17 provided upon the resonator 7. Energy is adapted to be removed from the resonator 7 via the concentric line terminal post 18.

A different tuning screw 19 is carried by the rigid portion of the resonator 7 and bears against a plate 20 connected through base 3 and header 6 to the flexible wall 21 of the resonator 7 for tuning this resonator. In use, the convergent electron beam 5 flowing from the wide angle emitter 2 passes through an accelerating grid 22 within the reentrant header 6 and through the small aperture at the inner end thereof, through the electron permeable inner portion of grid 8, the gap of resonator 7, and through grid 13 towards the reflector 14. Owing to the natural tendency of the beam to diverge after leaving the resonator grid 8 and to the mutual repulsion of electrons of the beam, this beam, after reflection from the region of the reflector 14 spreads into a hollow cylindrical return beam 5', which passes through grid 13 and an electron permeable outer portion of grid 8 in succession and then falls harmlessly upon the inner walls of the resonator 7 without returning through the inner portion of grid 8 and the opening of header 6, so that hysteresis is substantially eliminated.

The overhanging or outer portion of grid 8 receives the returning beam as shown in Fig. 1 and this grid by greatly reducing fringing or distortion of the electric field at the gap of the resonator enhances the power output of the tube. This is apparent from a study of Figs. 5 and 6. In Fig. 5, a non-overhanging grid 8' is shown carried by the inner end of the header 6'', so that the reflected beam, as represented by lines 5', crosses many of the electric field vectors 23 at a substantial angle, which results in little extraction of energy from the returning beam; bearing in mind that for maximum of extraction of energy the returning beam should flow parallel to the lines of the electric field. This ideal condition is obtained by use of the overhanging grid structure of this invention, as shown in Fig. 6, wherein the overhanging grid 8 provides electric field lines 23', which are substantially parallel to the returning beam 5', thus considerably increasing the output power of the tube. Since substantially no electrons return into the cathode space, i. e., since there is no hysteresis, this factor also considerably increases the power of the tube. In this way the output power of the tube by actual tests has been doubled over that provided by ordinary reflex tube structures.

The use of the highly convergent beam greatly aids in the splitting up or explosion of the beam upon its reflection by the reflector 14, so that a true hollow cylindrical beam 5' is produced on the return of the beam, said returned beam, due to the action of the overhanging grid in preventing fringing of the electric vectors at the resonator gap, giving greatly enhanced power to the tube.

In the form of tube structure shown in Figure 2, parts which are similar to those of Figure 1 are similarly numbered. In this structure, however, the reentrant header 24, instead of being of frusto-conical shape, is shown as an annular disc with a reentrant central cylindrical portion 24' surrounding the narrowest part of the beam 5. The returning electrons 5' fall upon the inner surface of the reentrant header 24 and upon the inner walls of the resonator. The action of this tube is similar to that of Figure 1.

The overhanging grid 8 also provides a means for increasing the capacity of the tube, whereby the frequency of the tube can be varied without the necessity of changing the resonator dimensions. For example, by increasing the diameter of the overhanging grid 8, as shown in the form of the invention illustrated in Fig. 3 of the drawings, the operating frequency of the tube can be lowered without changing the dimensions of the resonator 7. In this figure, the grid 8 is shown as of appreciable larger diameter than cooperating grid 13 carried by the opposite wall of the resonator. It will be understood that since the grid 8 is supported intermediate its width instead of at its periphery, the same has a cantilever action and is relatively rigid reducing microphonics and may be made lighter than if this grid were supported at its periphery, as in the case of ordinary grids. This means that the density of the grid, i. e., the thickness of the tine legs 10, 11 may be reduced thereby presenting lesser obstruction to the passage of the electron beam. Owing to the use of the high angle convergent beam, the minimum diameter of which substantially coincides with the inner opening in the overhanging grid and the natural tendency of the beam to spread thereafter results in the separation out of the maximum number of electrons on the return transit, thereby substantially eliminating multiple transit electrons, which would be out of phase with the initial electrons entering the resonator and as such, would detract from the power of the tube.

The capacity loading introduced into the resonator cavity by the use of the overhanging grid structure of this invention was found in practice to increase the power level at the lower frequency end of the tuning range by as much as 3 db, which is largely due to reduced secondary loading in conjunction with reduced multiple transit hysteresis. At the high end of the tuning range where the gap coupling is the important factor, the drop off of power was found to be much more gradual through use of the overhanging grid due to the direction of the electric field lines extending along the path of the returning electrons. If we let $u_1$ equal the coupling coefficient on the first transit of the beam and $u_2$ the coupling coefficient on the return transit, it will be found that the greater energy extraction will be possible by allowing the center of the overhanging grid to be free of vanes, as shown especially in Figure 4, thereby reducing $u_1$ due to the electric field sag across the aperture.

On the returning transit $u_2$ will be increased by the above consideration of the overhanging grid. The gain in energy will then be increased by the ratio of $u_2/u_1$. The resulting characteristic of the reflex klystron of this invention is one of wider, smoother tuning range, with gap tuning between the 3 db power points. In addition, the electronic band width is increased due to the absence of multiple transit hysteresis. It was found experimentally that the efficiency of a reflex klystron, as thus produced, was increased over the entire tuning range.

Figure 7 shows curves A and B corresponding respectively to the Frequency vs. Power output of the novel tube of this invention as compared with an ordinary reflex klystron tube. It will be noted that hysteresis depressions in the standard tube are missing from curve A representing the characteristics of the tube of this invention. The increase in power provided by the tube of this invention enhances considerably the effective tuning range of the tube.

Structurally the overhanging grid, since it is anchored near its center, aids in heat dissipation, while having high mechanical strength. The effective lengths of the vanes are reduced and higher beam power for a particular cross section of vane is possible. It also permits the use of a smaller cross section of vane or an aperture which reduces beam interception.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. An electron tube structure comprising a cathode for producing an electron beam, a resonator having a reentrant portion for receiving the beam for passage through the resonator, the inner end of said reentrant portion and the opposite wall of said resonator being apertured to accommodate said beam, a reflector positioned beyond the resonator for reflecting the beam back thereinto, and an overhanging grid structure carried by the inner apertured end of said reentrant portion of said resonator, said grid structure having a central portion extending across the aperture of said reentrant portion and having a coplanar overhanging portion extending outwardly beyond the periphery of said reentrant portion within said resonator, the central portion of said overhanging grid structure cooperating with the beam during its initial passage through the resonator and the overhanging portion of said grid cooperating with the beam during its return into the resonator.

2. An electron tube structure comprising means for producing and directing an electron beam along a predetermined axis, a cavity resonator having an apertured reentrant portion along said axis for receiving said electron beam for passage through the resonator, the wall of said resonator opposite said reentrant portion aperture being apertured to accommodate the beam, said reentrant portion having a grid structure at its inner end for cooperating with the electron beam passing through the resonator, and a reflector for redirecting the electron beam into the resonator after passage therethrough, said grid structure having an overhanging coplanar portion extending beyond the periphery of the inner apertured end of said reentrant portion within said resonator for receiving the beam upon its reentry into the resonator.

3. An electron tube structure comprising a wide angle cathode for producing a convergent beam of electrons, a cavity resonator having apertured walls for permitting the converged beam to pass therethrough, the aperture in one wall of said resonator being reentrant and having a first grid structure extending across the inner end of said reentrant portion, a second grid structure positioned in the aperture of the second wall of the resonator and cooperating with said first grid structure, a reflector positioned externally of the resonator for reflecting the electron beam back thereinto, said reflected electron beam being of substantially hollow cylindrical shape and passing into said resonator in surrounding relation to said reentrant portion, said first grid structure having an overhanging coplanar portion for receiving the reflected beam, said overhanging portion extending beyond the periphery of said reentrant portion within said resonator for receiving the reflected beam, said overhanging portion cooperating with said second named grid structure to provide electric field vectors extending substantially parallel with the path of the returning electron beam.

4. In an electron tube, a cathode for producing a high angle convergent beam of electrons along a predetermined axis, a resonator for sustaining an oscillating electromagnetic field therein, said resonator including hollow reentrant means having an apertured inner end along said axis for passage of said electron beam therethrough, means defining a resonator gap adjacent the inner end of said reentrant means, said gap defining means including entrance and exit grids through which said beam passes for cooperation with the field of the resonator, and a reflector positioned beyond said resonator gap and serving to reflect the beam back thereinto through said exit grid substantially in the form of a hollow cylinder surrounding the initial path of the beam, said entrance grid having an electron permeable annular portion extending radially outwardly beyond said inner end of said reentrant means and through which annular portion the returning electron beam passes for collection upon an inner wall of said resonator.

5. A high frequency klystron tube, comprising means including a cathode for producing and directing an electron beam which converges from said cathode to a region of minimum diameter along a predetermined axis, an electromagnetic resonator, said resonator including first and second electron permeable means spaced along said axis defining an electron permeable resonator gap along said axis, said first electron permeable means including inner and outer permeable portions in opposite relationship to inner and outer permeable portions of said second electron permeable means, respectively, at least the outer portions of said first and second electron permeable means including first and second groups of grid elements thereacross, respectively, the inner portion of said first electron permeable means being located in the vicinity of said region of minimum diameter of said electron beam, tubular shielding means having at least a part thereof extending along said axis between said cathode and said resonator gap for passage of said electron beam therein, said shielding means having a coaxial opening at one end thereof adjacent said inner portion of said first electron permeable means to communicate therewith for passage of said electron beam through said inner portions of said first and second electron permeable means, the diameter of said outer portion of said first electron permeable means being appreciably larger than the outer diameter of said end of said shielding means, reflector means spaced from said cathode along said axis beyond said second electron permeable means, and means including said reflector means for reflecting substantially all of the approaching electrons of said beam back through said outer portion of said second electron permeable means along divergent paths extending through said outer portion of said first electron permeable means within the outermost boundary thereof and outward of said one end of said tubular shielding means, whereby reflected electrons are excluded from the region of said cathode and substantial components of electric field lines in the vicinity of said resonator gap are substantially parallel with said divergent paths and fringing electric field lines along said paths are minimized.

6. A high frequency klystron tube as set forth in claim 5, wherein said first and second groups of grid elements extend across said outer portions and at least partially across said inner portions of said first and second electron permeable means, respectively.

References Cited in the file of this patent

UNITED STATES PATENTS

| | | |
|---|---|---|
| 2,468,152 | Woodyard | Apr. 26, 1949 |
| 2,482,769 | Harrison | Sept. 27, 1949 |
| 2,567,674 | Linder | Sept. 11, 1951 |